United States Patent [19]

Northcutt

[11] 3,967,690

[45] July 6, 1976

[54] DIGITAL READOUT DIET SCALE

[75] Inventor: Michael E. Northcutt, Mountain View, Calif.

[73] Assignee: Aledyne Corporation, Los Altos, Calif.

[22] Filed: Jan. 7, 1975

[21] Appl. No.: 539,109

Related U.S. Application Data

[63] Continuation-in-part of Ser. No. 445,218, Feb. 25, 1974, abandoned.

[52] U.S. Cl. .............................. 177/25; 177/164; 177/245; 177/DIG. 3; 235/92 WT
[51] Int. Cl.² ............... G01G 19/04; G01G 23/14; G06F 7/38
[58] Field of Search ............ 177/25, 164, 165, 245, 177/DIG. 3; 235/92 WT, 151.33

[56] References Cited
UNITED STATES PATENTS

| 2,913,238 | 11/1959 | Tommervik ........................ 177/25 |
| 3,375,357 | 3/1963 | Dekker et al. ...................... 235/174 |
| 3,469,645 | 9/1969 | Provi et al. ........................ 177/210 |
| 3,565,194 | 2/1971 | Engle et al. ....................... 177/164 X |
| 3,655,033 | 4/1972 | Yamajima ........................ 177/245 X |
| 3,866,699 | 2/1975 | Soehnle .......................... 177/245 X |
| 3,888,321 | 6/1975 | Wiiki et al. ....................... 177/165 |

Primary Examiner—George H. Miller, Jr.

[57] ABSTRACT

An electronic digital readout diet scale including means for accurately detecting and displaying minute changes of weight in a dieter accurate to small fractions of pounds is described. One embodiment comprises a transducer for generating a signal representing the weight of the dieter, and means for storing a signal representing a reference weight for the dieter. These signals are applied to a time gated oscillator whose output in turn is applied to an up-down counter. The counter is responsive to the oscillator output signals to display the dieter's weight or change in weight, and provides a digital display of current weight or weight change. A switching device, either manual or automatic with a time delay, first couples the transducer output to the counter to display the current weight of a user and then couples the storage means to the counter to decrease the displayed weight by the reference weight, whereby the relative change of weight of the user may be displayed.

15 Claims, 6 Drawing Figures

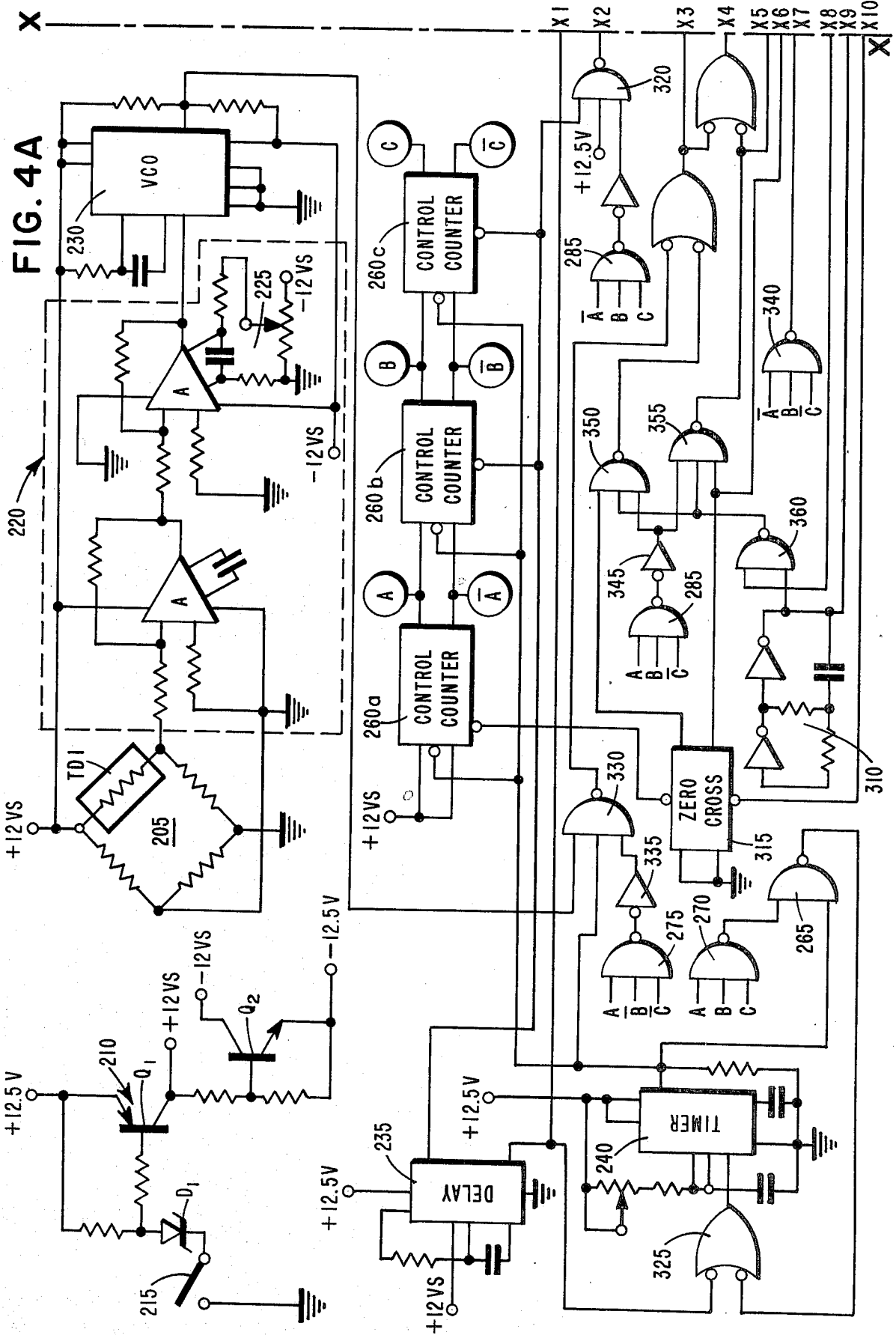

DIGITAL READOUT DIET SCALE

RELATED APPLICATIONS

This application is a continuation-in-part of application Ser. No. 445,218, now abandoned filed Feb. 25, 1974, by Michael E. Northcutt.

BACKGROUND OF THE INVENTION

Nature built into humans the capability to store food in the form of fat for hard times. In a society of overabundant food this facility becomes a detriment and is responsible for many of the physical ills of our nation. The problem is compounded by the security and pleasure which eating gives, starting in infancy.

Present bathroom scales are very poor as an aid to weight control. They are at best only accurate to one or two pounds. Strong psychological reinforcement is required to counteract the pleasures of eating. For example, reward in the form of positive reinforcement is enjoyed by the crash dieters. To reinforce the positive aspects of weight losing the "Weight Watchers" Organization forbids the use of scales except once a week, so that progress can certainly be noted. Lacking the rigorous discipline of such a program, after dieting for several days and seeing no progress, many people experience discouragement and quit. Thus current scales, being unable to detect and indicate limited gain or loss of weight, actually act in a negative way.

The requirements of a bathroom scale providing both the requisite accuracy and designed to give the necessary psychological reinforcement are extreme. In weighing a human, a range of one to 300 or more pounds is required. If accuracy to 0.1 pound is desired this is one part in 3,000. This refinement exceeds the prior art limitation of mechanical and spring scales for bathroom use. Laboratories circumvent this magnitude of error by weighing in very limited ranges. Even physicians' scales with their extended beams do not give accuracy of the order herein envisioned.

A review of electronic scales shows consideration of tare weight, digital display, and various electronic measuring devices such as pressure transducers, wheatstone bridges, etc. However, none of these are applied to scales suitable for home use in a personal dieting program and designed for the purpose herein outlined, to provide both the required accuracy and readout format to attain the psychological reinforcement which is the aim of this unique design.

Several patents, such as Benedict U.S. Pat. No. 2,108,575, Provi et al U.S. Pat. No. 3,469,645, Hoffman U.S. Pat. No. 3,550,705 and Hutchinson et al U.S. Pat. No. 3,667,561 disclose scales suitable for home use and having electrically operated readouts. However, none has provided the capability or even recognized desirability of reading in ounces or small fractions of pounds and displaying either absolute weight relative difference between the current weight applied and a previous reference weight, as does the device described herein. Similarly, several published patents such as Rock U.S. Pat. No. 3,812,923, Smith et al U.S. Pat. No. 3,684,875 and Henderson et al U.S. Pat. No. 3,665,169 disclose apparatus in which tare weight or some other previous weight is deducted from a subsequent weight. However, none of these structures would be suitable for incorporation into any scale similar to those referenced above or that in the following disclosure. More particularly, the differential in weight discussed herein should not be confused with tare weight, since tare weight relates to containers and added or subtracted objects. Here we are dealing with weighing the same object and showing deviations with regard to time. No dialing, switching or other input is required, as would be the case with tare computations, since we are relating only to a fixed set of feedback data predetermined by formulate unique to this appliance and always relating to the same individual or small group of individuals.

The existing art demonstrates that digital readouts have been suggested for scales and that the concept of a scale suitable for home use having an electrical readout is also old. However, none of the home use scales known have sufficient accuracy to provide very accurate digital readouts to ounces or fractions of a pound over the required range, nor do they include means to indicate the relative (rather than absolute) differential between a person's previous weight and his current weight.

SUMMARY OF THE INVENTION

A personal diet scale is proposed which comprises a force voltage transducer and means responsive thereto to provide a readout not only in pounds but also in half or quarter pound increments or in ounces or in decimal equivalents to include tenths or hundredths of pounds or kilograms, or to other fractions of pounds, preferably over a range of normal human weight from zero to at least 250 pounds and preferably to 300 pounds. The scale is electronically operated by line voltage or batteries and may incorporate a digital display. A memory circuit and a circuit operable of reversing the counter to provide a readout of the relative difference between the prior weight as compared to current weight of the person desirably are provided. Further, a zero crossing circuit may be provided cooperating with the reversing and memory circuits so that the digital readout is the relative difference (gain or loss) between current and reference weights. The current invention may monitor in said manner several members of a given family simultaneously. It is simple in construction and avoids the need for manual setting of any sort with each weighing, aside from occasional zeroing of the readout as is found in any scale.

The scale herein disclosed is designed to provide a reading accurate to fractions of pounds (or kilograms) over a three hundred pound range. By utilizing such a scale a person may skip lunch and at evening weighing get positive reward and psychological encouragement to go on. The preferred embodiment displays by electronic digital display and has calculator functions to show deviation of weight since start of the diet program or the last weighing.

In a useful alternative embodiment, a switching device is provided so that several members of any family can concurrently use the differential storage and readout features of the scale. For example, a multi-color switch may be provided. Each member of the family selects a color switch and activates it at the start of his diet. From then on, no switching is required except that the individual must always have the instrument in his color mode when weighing. The diet scale may be used for addition as well as subtraction modes. This facilitates its use in charting growth in children and gain and loss of weight with precision as applied to sickness or other medically related problems. Thus, the scale has an expensive range of uses and may be provided in somewhat larger form for physicians and hospital use.

BRIEF DESCRIPTION OF THE DRAWINGS

FIGS. 4A and 4B together represent a detailed schematic of a third embodiment of the digital weight comparing scale of this invention.

DETAILED DESCRIPTION OF PREFERRED EMBODIMENTS

Figure 1:
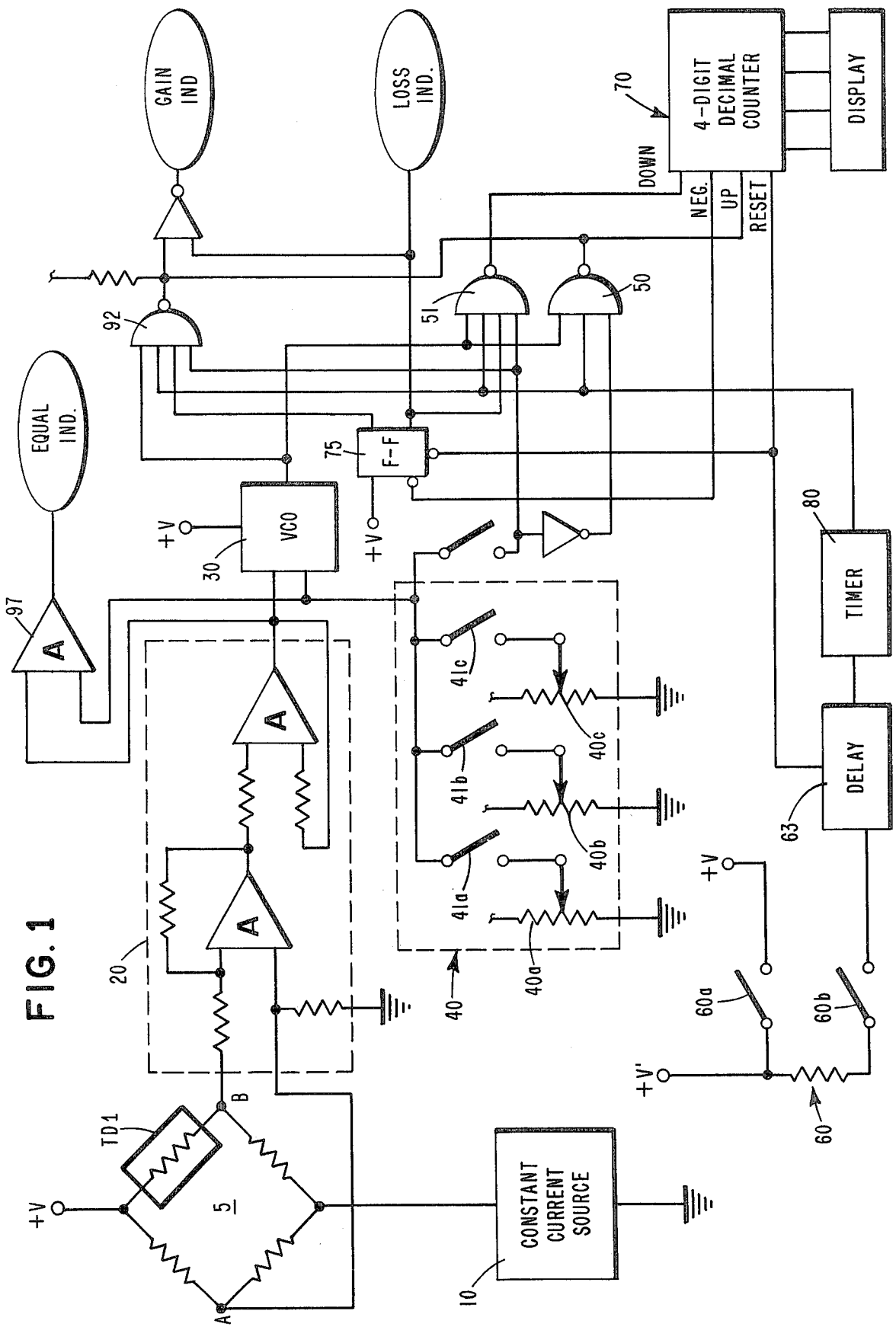
FIG. 1 is a block diagram of an embodiment of the digital weight comparing scale of this invention.

Referring to FIG. 1 there is shown a diagram of an electronic scale which measures weight, displays the measurement, compares the value, indicates whether a loss or a gain has occurred and displays the amount of loss or gain. Means are incorporated to store a weight measurement for future reference.

Considering the block diagram of FIG. 1, to operate the scale the dieter steps on the scale platform (not shown) which closes a switch connecting a power supply to the circuitry and applies a force to the bridge type force transducer TD1 fed by a constant current source 10. The transducer may exemplarily be a PI-TRAN pressure sensitive resistor made by IC Transducers Inc. of San Jose, California. Current flowing through the bridge 5 causes a voltage difference to be developed between points A and B which is proportional to the dieter's weight. This voltage difference is amplified by differential amplifier and isolation amplifier 20 and fed to the input of the voltage controlled oscillator (VCO) 30.

The VCO 30 produces an output pulse stream of a frequency which is proportional to its input voltage (and, in turn, proportional to the dieter's weight). When the dieter steps on the scale a signal is sent from manually operable switch 60 to the counter control section comprised of delay device 63 and the timing gate generator 80. This manual two-position switch 60 can cause the counter to count up (dieter's current weight) or down (weight differential). This signal causes the delay generator to start limiting out the amount of time appropriate to allow the sensor TD1, amplifier 20 and oscillator 30 to reach a stable output (about 2 seconds) and the counter 70 to clear. At the end of this delay, timing gate generator 70 emits a gate signal of precisely controlled duration. Until this gate signal was generated, the zero output of the timer 80 held the coincidence gates 50 and 51 through which count pulses are fed to the counter 70 closed, holding the counter 70 at zero state. The timing gate 80 output is applied to the input of counter control gate 50, whose other two inputs are asserted by a manually controlled switch output and the presence of the VCO output. The output of counter gate 50 is applied to the counter's "up" clock input casing the counter to count up until the timing gate input signal from the timing device 80 is removed from the control gate 50 causing the gate to no longer pass through clock pulses to the counter. The frequency of the VCO 30 is proportional to the dieter's weight; thus the duration of the timing pulse gate is used to set in the appropriate scaling factor to accommodate various measurement systems - (e.g., English or Metric), so that the counter's readout is the appropriate digital numeral to express weight in the chosen system.

To get a display of the change in his weight since the dieter last stored a value the dieter activates the second portion b of manual switch 60, which does two things. First it sends a signal to the delay timer 63 which causes it to start timing out an appropriate delay before issuing another signal to the timing gate generator 80. The switch also disconnects the input of the VCO from the transducer and applies to this input the signal from the resistor wiper of one of the reference storage elements 40 a, b, c on which the dieter has stored a representation of his reference weight measurement in a manner explained below. This voltage then takes the place of the transducer - amplifier output in determining the frequency at which the VCO 30 will oscillate, the frequency being proportional to the value stored in the resistor setting (i.e., the previous weight or reference). The manual switch also provides an input to coincidence gate 51 which is the input gate to the down counter input. When this manual switch signal is present together with the timer 80 output and the pulse train from VCO 30, the paths to activate the counter 70 via this down count gate 51 are all asserted. Gate 51's output causes the down clock on the counter to be clocked until the end of the gate timing pulse, at which time the contents of the counter will indicate the dieter's present weight minus his stored weight measurement. There are three results which could be present in the counter at this time — the dieter's present weight could equal his stored weight and, as such, the counter would read zero; the dieter's present weight could exceed the previous weight and the counter would contain the difference between the present weight and the stored weight; the last alternative is that the dieter's present weight is less than the previously stored value. In this case when the counter goes through zero a signal is detected by coincidence gate 92 that also sets the negative zero crossing gate flip-flop 75 causing down gate 51 to close and stop passing count pulses to the down counter input, and opening gate 50 to start passing the VCO output pulse train to the counter up input and start counting the counter 70 back up; also, the positive feedback indicator (LOSS IND) lights; thus at the end of the gate time from timer 80 the counter 70 would display the relative difference (gain or loss) between stored reference weight value and current weight value.

The dieter is provided with a means to store his present or reference weight measurement in a resistor 40 a, b, or c by closing the set switch 40 a, b, or c coupled so that storage resistor and standing on the scale to activate the transducer output. The transducer output is compared with the voltage setting on the selected resistor by the comparator amplifier 97. The dieter manually adjusts the selected potentiometer 40 a, b, or c, until the equal indicator is lit at which time the resistor setting establishes the present or reference weight. The use of a multiple switch allows several dieters to use the same scale, each with his own stored reference weight value, the appropriate switch being closed to apply the corresponding reference to the scale.

Figure 2:
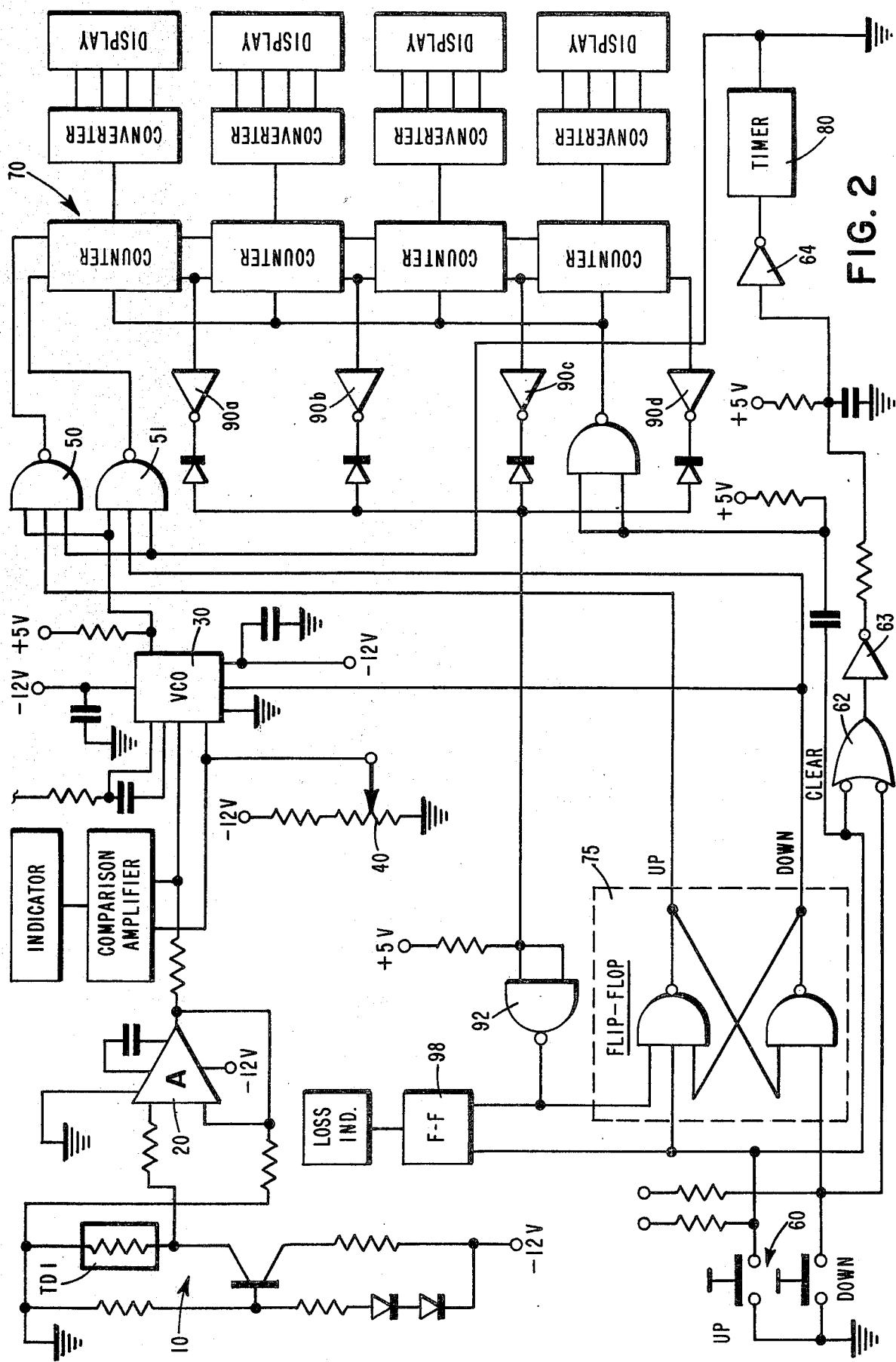
FIG. 2 is a detailed schematic of the embodiment of FIG. 1.

Considering the detailed schematic diagram of FIG. 2, the transistor T1 and the several diodes and resistors in the upper left hand corner comprise a constant current source 5 to the force transducer TD1. The force transducer TD1 in the collector circuit of the transistor T1 functions in substantially the same way as a variable resistor in the collector circuit; that is, a change in the force applied to the transducer has the effect of a change in resistance in the collector circuit and therefore a change in the output current of the constant current source across resistor R11 to the input of the operational amplifier 20. Thus the output signal from the constant current source is proportional to the weight of the person being weighed.

The operational amplifier 20, which is also used to provide isolation, essentially functions to provide a conversion of the voltage proportional function which is applied to its input to a voltage value that makes the voltage controlled oscillator 30 oscillate at an appropriate frequency to represent the weight of the person applying force to the transducer. The operational amplifier may suitably be a National LM301; the voltage controlled oscillator may suitably be an EXAR 2307.

It can be seen that the output of the operational amplifier 20 is applied to one of two switchable inputs 31 and 32 of the voltage controlled oscillator 30; the other of the two switchable inputs is tied to a storage device 40 comprising a variable resistor coupled between a constant voltage source and ground, and which may be adjusted in accordance with the invention to store a signal representing the reference weight of the person which is to comprise a basis of comparison for determining the change in weight of the person being weighed, as discussed with respect to FIG. 1. Two lines come into the bottom of the operational amplifier; one of them is grounded, and the other is the control line that orders the voltage controlled oscillator 30 to respond to the voltage from the transducer 10 applied through operational amplifier 20, or the voltage stored in storage device 40. Thus means are provided for making the pulse generating voltage controlled oscillator responsive to either the current weight value of the person being weighed (as represented by the signal from operational amplifier 20) or the stored reference weight value of the person being weighed (as represented by the signal from storage device 40), whereby the difference may be determined. The output of the voltage controlled oscillator is applied to one input of both gates 50 and 51 which comprise a switch for controlling the direction of count of the up-down counter 70. The direction control gate switch 50, 51 is responsive to manually controlled switch 60 for causing counter 70 to display either the absolute weight of the person being weighed, or the relative change (positive or negative) between the current weight of the person and the stored weight of the person. The directional gate switch is also responsive to a timing device 80 which provides a gate pulse function for gating the pulses from the voltage controlled oscillator 30 to the counter 70 so that a constant duration gate for direction control switch 50, 51 is always developed, whereby the change in pulse rate or the pulse count occurring within the gate from the voltage controlled oscillator accurately represents the change in weight or the weight of the object. The counter itself comprises one or more bi-directional counters which may be a 74C192 or equivalent, the counts therein being applied through converters which may be type 4010 to display devices which may be H.P. 7302 or equivalent. The outputs of gates 50, 51 are connected to the up and down inputs of the counters to control the amount and direction of count; further description of the implementation of counter and display 70 is deemed well within the skill of the art.

Considering the manual switch 60 which controls the direction of count, the switch comprises two sets of contacts labelled "up" and "down", respectively, to thereby correspond to the desired direction of count of the counter 70. The "up" orientation of the switch and direction of count corresponds to a determination of the actual weight of the person; the "down" orientation of the switch and direction of the count corresponds to a determination of the relative change in weight between the actual weight of the person as now being applied and the reference weight previously stored in storage device 40. In operation of the scale, to obtain a readout of weight differential, the actual weight of the person is first obtained (up), then the switch activated to subtract the stored reference weight therefrom (down) thereby providing the desired readout.

Taking the first case where the "up" count to determine actual weight of the person to be weighed is desired, the output is applied to the set input of a flip-flop 75 which comprises as shown a pair of cross-coupled gates. The "up" output of flip-flop 75 thereby goes high and opens gate 50 of the directional counter control means. The "down" output of flip-flop 75 remains low, so that the voltage controlled oscillator 30 is responsive to the output of the operational amplifier 20 which is the adjusted output of the force transducer TD1, to thereby control the pulse rate output of the oscillator. Closure of the "up" switch of manual switch means 60 also applies a signal on the clear line to the clear input of timer 80 and counter 70. Thus the counter is zeroed before the output of the timer opens the gate 50 to pass the pulse count to the counter 70. The signal from the manual switch means 60, in this case the "up" switch thereof, is also passed through a NOR gate 62 and suitable delay means 63, 64 to the trigger input of the timing device 80 which generates a gate signal to control the length of time for which control gate means 50, 51 will be open. This gate is fixed at an accurate constant duration by the capacitors and trimmer resisitors shown associated with timer 80 so that the scale can be calibrated to a high degree of accuracy, and also be adjusted to read in pounds, kilos, or ounces, or halves, quarters or tenths of pounds depending on the adjustment made to the duration of the gate.

Delay means 63, 64 are interposed between NOR gate 62 and timer 80 so that the trigger signal to the timer is delayed until the counter 70 is cleared and oscillator 30 stabilized. Thus the control gate means 50 is always open for an accurately fixed length of time to pass the weight representing pulse output of the voltage controlled oscillator 30 to the digital display counter 70. The pulse frequency output of the voltage controlled oscillator, as counted during the fixed gate period, thus accurately represents the amount of the force applied to the force transducer 10. Thus the weight of the person is proportional to fixed oscillator frequency which is proportional in turn the voltage output of the transducer which is fixed by the force applied to the transducer. This system design minimizes error and provides a highly accurate and calibratable readout whereby accurate comparisons between current weight and stored reference weight may be obtained.

To obtain the change in weight between the weight now registered by the person on the counter 70 and the weight value previously stored by storage device 40, the "down" switch of switch means 60 is now closed. An appropriate input is now applied to the reset input of flip-flop 75; no signal is applied to the clear line of the counter, but a signal is again applied through the delay means 63, 64 to the timer to generate another gate function. The "up" output of the flip-flop 75 is now low, closing gate 50; the "down" output of flip-flop 75 is now high, opening gate 51 to pass pulses from the pulse output of the voltage controlled oscillator 30 which occur concurrently with the gate function from the timer 80 to the counter's "down" input. The high signal on the "down" output of flip-flop 75 which as discussed above selects the appropriate input to the voltage controlled oscillator, now causes the voltage controlled oscillator to respond to the voltage stored in storage device 40. This voltage represents the previous weight of the person being weighed; it is previously separately set into the scale using a comparison means connected between the output of transducer 10 and the storage means 40 and a separate indicator light. For example, a differential amplifier (not shown) may be connected switchably across inputs 31 and 32 having indicator connected to the output thereof; the person seeking to store a weight value on the scale to apply force to the force transducer by adjusting a manual control or the like coupled to the resistance arm of storage device 40, the status of the adjustable resistor 40 being adjusted until equality is achieved as indicated by the output of the differential amplifier between the voltage stored in storage device 40 and the voltage output of transducer 10. At this time, the current weight of the person standing on the scale is now stored in the storage device 40.

Therefore, when the signal to the voltage controlled oscillator 30 from the counter flip-flop 75 directs the flip-flop to respond to the voltage in storage device 40 through counter input 32, then the output of the voltage controlled oscillator 30 becomes proportional to this stored value. After a delay time to allow for this output pulse train to stabilize the gate function generated by the timing device 80 occurs and the counter is now counted down, the "down" counter gate 51 being open. Thus the counter is counted down by a weight proportional pulse train which is applied to the counter for the exact same time period (i.e., gate function) as the count up pulse train, whereby an accurate differential between the person's stored weight is determined.

Means are also provided for determining a zero crossing of the counter. These zero crossing means comprise a series of gates 90a–d coupled between the counter elements of counter 70 and feeding a control gate 92, which in turn is connected to the set input of the control flip-flop 75 as well as to an indicator light. Thus it may be seen that if each of the counter elements is counted down to zero and then the stored value is equal to or greater than the person's present weight, then a greater pulse count will occur than occurred when the person's current weight was measured. At the time zero status of each counter element of counter 70 is detected by the gate 90, the output of the gate 92 is applied to the "up" input of flip-flop 70 causing the output of the gate control 50, 51 to switch and cause the counter to begin to count back "up" so that a positive indication of weight differential is always read out on the counter display whether the differential is positive or negative. The indicator coupled to flip-flop 98 having two inputs, one from the clear signal and the other from the output of gate 92 lights to indicate that this zero crossing has occurred and, in this instance, that since the stored value is greater than the current weight value that a loss in weight has been achieved.

Thus the operational sequence for using the disclosed device is for a person who wishes to store his weight and record changes therein to stand on the scale and using the manually adjustable resistor incorporated in storage means 40 adjust the storage device until the voltage stored therein is the same as the voltage output of the operational amplifier which represents his current weight. Then, when he wishes to determine his change in weight, the person stands on the scale and pushes the "up" button, causing the counter to count up to his current weight accurately expressed in tenths of pounds or kilograms as determined by the calibration of the gate generating timer 80. Then, the "down" button is pushed causing the output of the storage device 40 to control the pulse rate output of the voltage controlled oscillator 30. The storage representing pulse train is applied to the counter through the count down gate 51, causing the counter to be counted down towards zero. If a gain in weight has occurred, no zero crossing occurs and the counter stops at a value representing accurately the gain in weight. If a loss in weight has occurred, the indicator light controlled by flip-flop 98 and control gate 92 is lit, and the flip-flop 75 is triggered to cause the counter to count back up to the value representing the loss in weight. Thus, an immediate indication in accurately expressed terms is provided of the relative gain or loss in weight achieved by the person using the digital counter scale. Of course, a plurality of persons may use the scale by providing a multi-position switch between storage means 40 and gate input 32, and providing a separate variable resistor between a constant voltage source and ground in the storage means 40, for each person using the scale (see FIG. 1). A manual selector is provided correlated with the storage to select the storage resistor storing the person's weight. No further means need be provided to store the weight of each of a group of persons. Moreover, as the same electronic elements are used to determine both the stored weight value and the current weight value an extremely accurate representation of change in weight is always provided.

Figure 3:
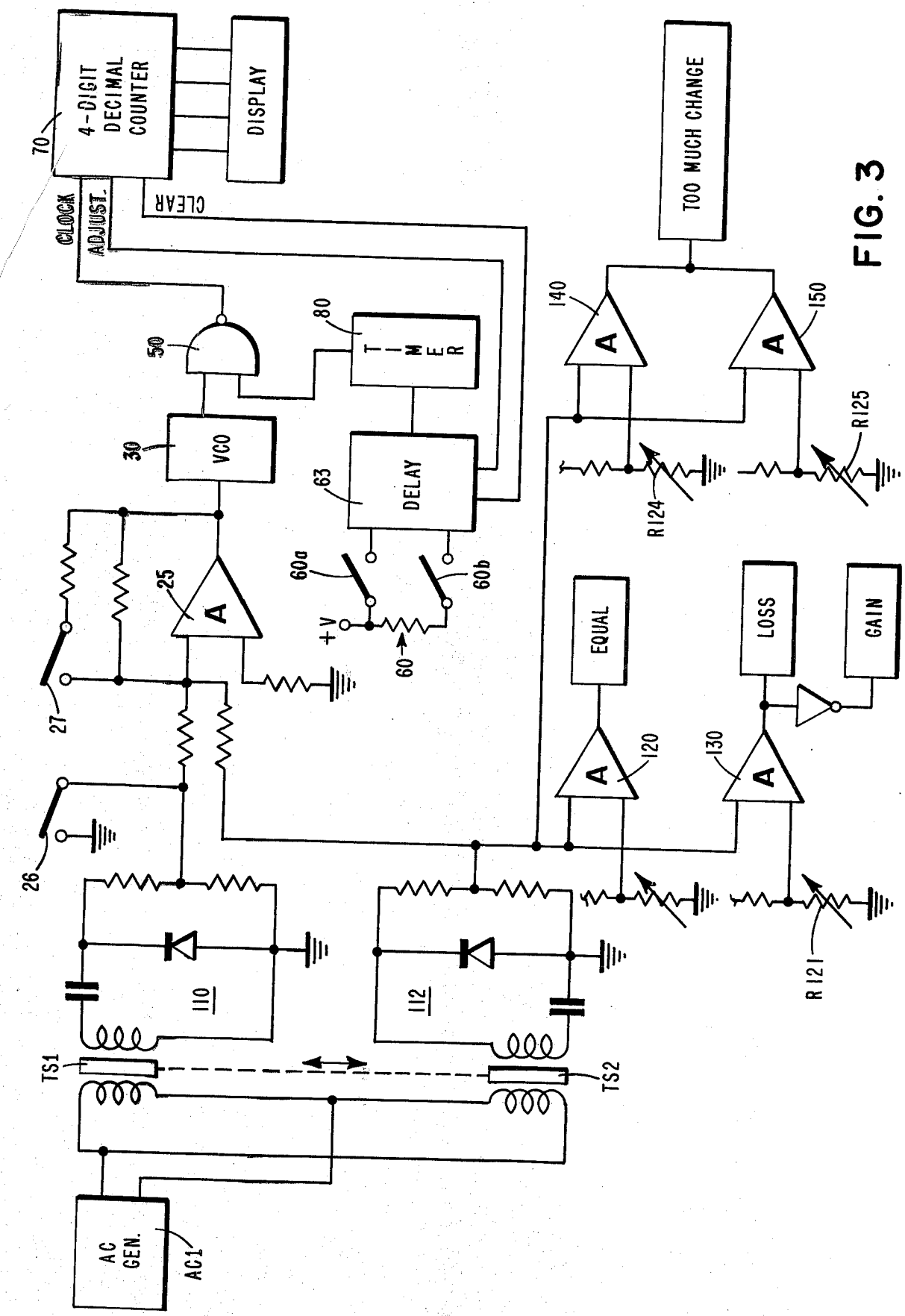
FIG. 3 is a block diagram of an alternative embodiment of the digital weight comparing scale of this invention.

In an alternative embodiment of the invention to that disclosed in FIGS. 1 and 2, a number of persons may use the scale by providing a weight storing transducer for each person, as represented by the structure of FIG. 3. In operating a scale implemented using this method, the dieter steps on the platform to which is attached the main sensor TS1 and supplementary sensor TS2 via a mechanical linkage. This type of sensor may conveniently be a transformer with a moveable core; the greater the movement of the platform-linkage combination the greater the core movement and hence the better the coupling between the primary and secondary of the transformer-sensors TS1, and TS2. The AC voltage from the generator AC1 is thus coupled across sensors TS1 and TS2 so as to produce an output voltage which is proportional to the dieter's weight. Rectifying networks 110, 112 are coupled to the sensor outputs to filter this AC voltage. This filtered voltage is coupled to the input of an operational summing amplifier 25 which provides the input to the voltage controlled oscillator 30 and represents the scaled sum of the outputs of TS1 and TS2 for reasons explained below. The oscillator's output frequency is thus proportional to the dieter's weight. When the dieter stepped on the scale a signal was sent to the control section 60 including manual control switches 60a, 60b to start a delay time out. After this delay the gate generator 80 produces a gate whose duration is precisely controlled. Just before this gate is produced the counter is cleared by the delay timer 63, 64. During the assertion of this timing gate, the output of the oscillator is passed to the up clock input on the counter 70. The gate's duration and the frequency of the oscillator output combine to yield the value in the counter at the end of the gate time just as in the previously described method, thus producing the measurement of the present weight of the dieter.

The method of obtaining the difference in the dieter's weight and storing a weight reading is different from the previous embodiment. The dieter stores his weight reading by setting sensor TS2's beginning point of movement; in other words, the second transducer's physical position stores the value of the dieter's weight measurement. This is accomplished by setting the second transducer's TS2 movement arm in such a way as to cause movement only after a certain portion of the travel of TS1 has been accomplished. By way of example if the dieter weighed 140 lbs. and wanted to store that value he would put the scale into the store mode be setting a switch 27 which would enable the comparator 120 to be connected to TS1 and TS2, turning an adjustment screw until the voltage output from TS2 matched the zero set voltage store on R121 at which time the equal indicator is lit. This adjustment screw would actually be moving TS2 until a "NULL" voltage occurred. From this point on then whenever the dieter depressed the $\Delta$ W switch 26 a measurement is taken relative to this setting. Since the dieter can either gain or lose weight the actual "zero" or "null" point is set ½ way through the travel of the second sensor TS2 and the control mechanism compensates for the non-zero position of the sensor by adjusting the final value in the counter by an appropriate amount. This value is obtained in the same manner as a normal measurement is taken. Amplifiers 120, 130, 140 provide the means by which the indicators are lit to feed back to the dieter his state of affairs. As mentioned earlier amplifier 120's output is used to indicate the equal condition in setting up the $\Delta$ W sensor, — it doubles as an equal (or stable) indicator in normal operation — i.e., if the dieter's weight is stable (no change) this indicator is lit when a $\Delta$ W measurement is demanded. Amplifier 130's inputs include the $\Delta$ W sensor output and the "zero" reference voltage. If the dieter has lost weight, its output is not asserted, causing the loss indicator to be lit and the amount of loss to be displayed. If he has gained weight the $\Delta$ W voltage is greater than "zero" voltage stored on R121 and the output of amplifier 130 is asserted lighting the gain indicator and extinguishing the loss indicator. The amount of weight is obtained and displayed in the same manner as the absolute and loss measurements.

One problem which is present in this mechanism which is not present in the embodiment of FIG. 1 is the possibility that the range of sensor TS2 might be exceeded by a large change in weight; sensor TS2 operates as a "fine" scale weight change device and, as such, an indicator must be included to indicate when its range has been exceeded. Sensors CA3 and CA4 provide this service by checking the $\Delta$ W voltage against the values set in resistors R4 and R5. If the range is either too low or too high the "too much change" indicator as lit, indicating the need for the dieter to readjust his scale.

In a third highly desirable embodiment of the scale of this invention (FIGS. 4A and 4B) means are provided both for storing the dieting user's weight measurement automatically, without manual adjustment of the scale, and for displaying sequentially and automatically his current weight and then any weight loss or gain since the previous measurement. This embodiment incorporates solid state memory and switching devices to effect automatically the required storage and display switching operations. In this third embodiment the analog portions, including the transducer 205, the differential amplifier and isolation amplifier 220 and the voltage controlled oscillator 230 are substantially similar to that described in detail in the embodiment of FIGS. 1 and 2, with the addition of zero offset adjustment 225, and will not be described in detail here.

This embodiment of the diet scale incorporates, as could the other embodiments, a power turn-on circuit 210 including a switch 215 which is closed by pressure applied to the scale platform, as by a user stepping thereupon. When switch 215 is closed, Q1 is turned on, which turns on Q2. The zener diode D1 in the circuit provides a regulated voltage (+12VS) to the transducer, its associated amplifiers and the VCO. Q1 also supplies a signal (+12VS) to power the digital circuits described herebelow.

Figure 4B:
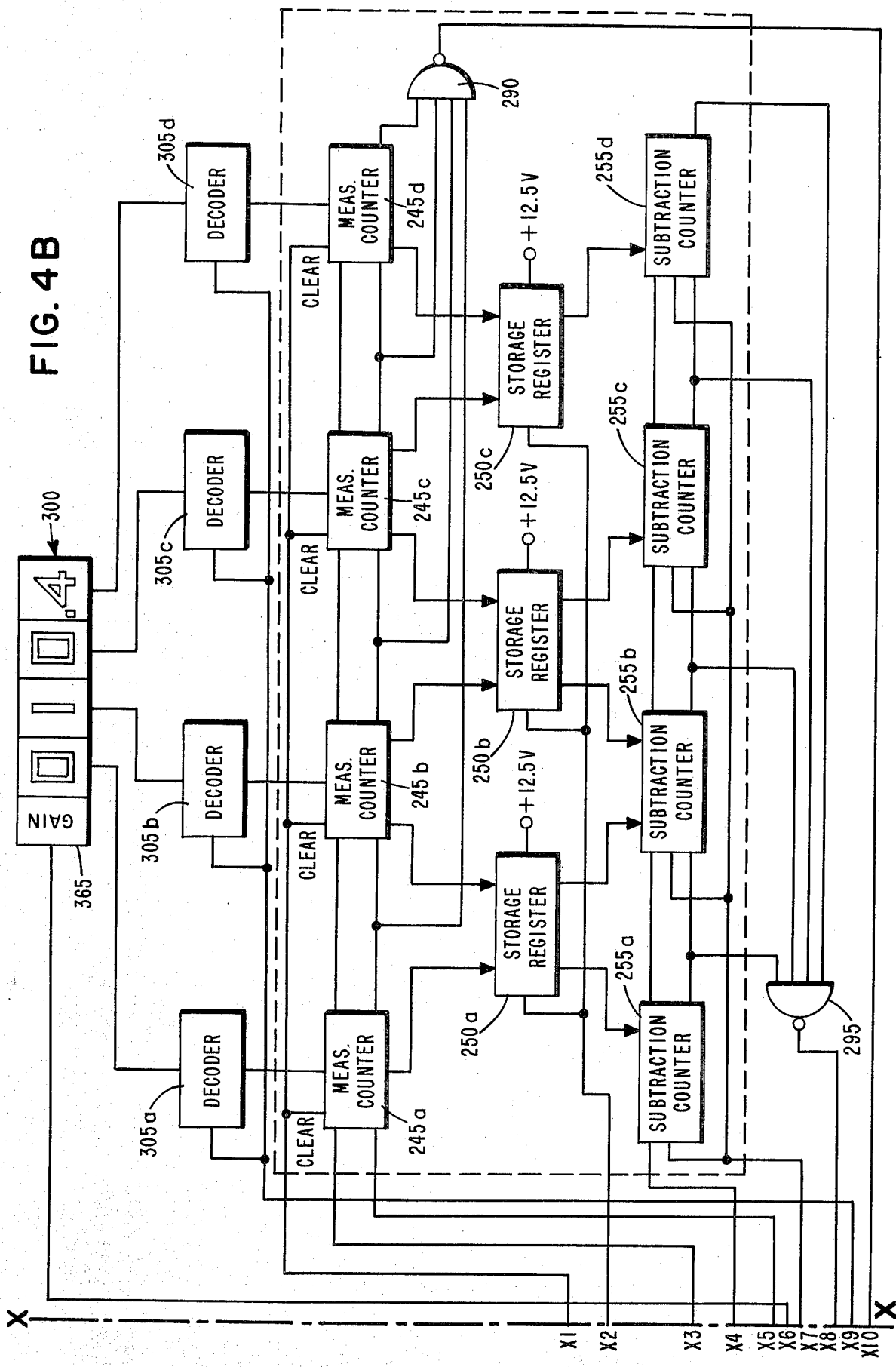

The digital circuitry of this scale is divided between FIGS. 4A and 4B for the sake of clarity afforded by a larger scale illustration. It is to be understood that the circuitry of FIGS. 4A and 4B represent one unitary embodiment of the scale, with the illustration simply divided along lines X—X with the connections numbered $x1 - x10$, respectively, corresponding to one another in both figures. For clarity, this circuitry will be described first with respect to its principal functional components and then in detail with respect to the sequence of operations.

In the diagram of FIG. 4A, a monostable multivibrator 235 is provided to produce a two second delay after turn-on from switch 215, to permit weight shifting and other fluctuations to settle. Such delay unit may suitably by an EXAR 4047 multivibrator or equivalent. Timer 240 is a precise measurement timer which is adjustable in the same manner and for the same reasons as in the previous embodiment. Measurement counter 245a–d (FIG. 4B) is an up-down counter as previously described, and may suitably comprise a plurality of 74C192 circuits. The value measured from counter 245 is stored in the storage register 250a–c, which may conveniently be 74C174 circuits and which are powered directly from the 12.5 volt source and not from the power switched circuit, so that, when the scale is not energized by the closing of switch 215, the value stored in register 250a–c will not be lost due to the loss of power. For determining weight changes there is added to this embodiment another counter 255a–d (which may also be 74C192's), whose purpose is to hold the value which is to be subtracted from the measurement counter and counted down.

To provide the major time periods during which certain operations, described below, take place, there is provided a control counter chain 260a, 260b, 260c (FIG. 4A), which may comprise a plurality of 74C73's. This counter chain 260a–c is clocked by the timer 240 output and is made to loop back on itself and oscillate by NAND gate 265, causing the counter chain to count up at the rate determined by the timer 240 oscillation frequency. The time periods determined by the counter 260a–c are decoded by NAND gates 270, 275, 280 and 285.

NAND gates 290 and 295 (FIG. 4B) decode when the measurement (up-down) counters 245 and the subtraction (down) counters 255 pass through zero respectively.

Display 300 is a seven segment liquid crystal display which is driven by a plurality of 74C48 BCD-to-7-segment decoders 305a–d connected to the measurement counters 245a–d.

Oscillator 310 is a two-inverter R-C coupled oscillator whose frequency is at least 3000 times the timer gate interval but less than the highest clock frequency of the measurement counters 245. One output of the oscillator 310 is connected to the blanking inputs of the display decoders 305a–d to provide an alternating current signal to gate the liquid crystal, to provide for best liquid crystal display operation.

With reference to the foregoing description and the diagram of FIGS. 4A and 4B the sequence of operations of the scale of this embodiment is as follows:

When a user steps on the scale, his weight applied to the platform (not shown) closes power switch 215, which in turn activates switches Q1 and Q2. The signal +12VS from the emitter of Q1 provides power to the digital circuits and a trigger input to the monostable multivibrator delay 235. The delay 235 times out for about two seconds while clearing the counter chain 260a–c, the zero cross flip-flop 315 (a74C73) and the holding-off gate 320 to prevent false triggering of storage registers 250a–c. At the end of the two second interval the D output of the delay 235 goes low, activating NOR gate 325 and starting the oscillator of the timer 240. This oscillator gates the VCO output through NAND gate 330, as the output of NAND gate 275 is asserted at this time via inverter 335. Measurement counter 245a–d is counted up for the duration of the measurement interval (the assertion time of the timer 240), thereby providing for time averaging the VCO output signal and thus the measured weight indication over the period of the measurement interval. This measurement interval, from timer 240, is selected to provide the weight measurement in the desired increments of ounces or halves, quarters, or tenths, of pounds or kilos, or other units. When the timer 240 is no longer asserted, NAND gate 265 acts as a feedback gate and restarts the timer. The second edge of the timer clocks the counter chain 260a–c, causing it to count up by one. This deactivates gates 275, 335 and 330 and activates NAND gate 340, transferring the contents of the storage register 250a–c into the subtraction (down) counter 255a–d. At the next timer clock edge, NAND gate 285 is activated, copying the contents of the measurement (up-down) counter 245a–d into the storage register 250a–c thus storing the current measured weight for the next time the user uses the scale, to have it available for comparison with a subsequent measured weight.

During the next two timer cycles nothing happens except the display for a predetermined time of the current measured weight value. Then, during the following timer cycle, NAND gate 280 is activated. This step gates the output of the oscillator through to the count-down input of the measurement counter 245a–d and the subtraction counter 255a–d, simultaneously counting them down until either a zero crossing is sensed by NAND gate 290 or a zero in the subtraction counter is sensed by the NAND gate 295. If a zero crossing is sensed by gate 290, the zero crossing flip-flop 315 is jam-set by gate 290. This causes the count direction to change on the measurement counter to "up" via NAND gates 350 and 355, acting through NOR gates 352 and 357. The subtraction counter continues to count down until it is at zero, at which time the gate 295 senses this condition. If the subtraction counter is zeroed in this manner or in the manner previously described, the oscillator output is gated off by NAND gate 360, preventing further counting. At this time the difference between the previous measurement (from the storage register) and the current measurement are displayed on digital display 300. If there was a zero crossing, the user gained weight, and the indicator 365, driven by zero crossing detector 315, is lit, thus indicating a weight gain, with the amount displayed in the display 300. If the previous weight measurement is larger than the new measurement, no zero crossing is detected and the amount of loss is held in the measurement register 245a–d and thus displayed in the digital display 300. At the next clocking of the timer 240, NAND gate 270 is activated, stopping further oscillator action by the timer 240. Thus, the digital display will continue displaying the difference between the previous weight measurement and the current weight measurement until the user steps off the scale, deactivating the power switch circuitry 210.

In another variation of the scale of the immediately preceding embodiment provision may be made for storing a plurality of previous weight measurements, so that the scale may either be used by a corresponding plurality of users and in the manner above described, or an individual user may store a plurality of his previous weight measurements for later comparison against subsequent measurements. One illustrative embodiment of this variation in structure is illustrated in FIG. 5 wherein the structure enclosed within the broken line may be directly substituted for the structure enclosed within the broken line of FIG. 4B.

Figure 5:
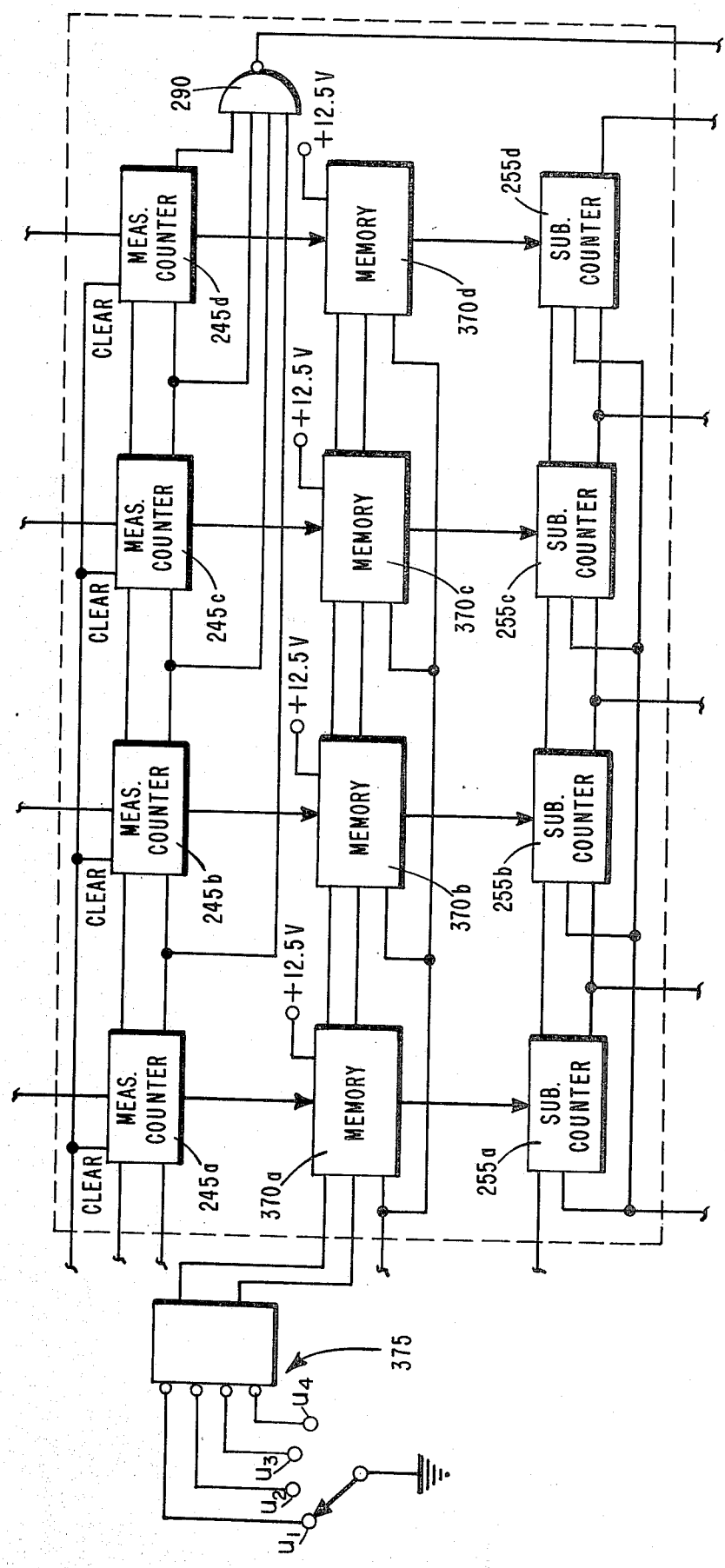
FIG. 5 illustrates a modification to the schematic of FIG. 4B to provide for usage of the scale of the third embodiment by a plurality of individuals.

In the structure of FIG. 5, the measurement counter 245a–d, subtraction counter 255a–d and gate 290 are the same as in FIG. 4B, with identical connections across the broken line. However, in place of storage register 250a–c of FIG. 4B an array of 16 bit (4 × 4) memory chips 370a–d, controlled by a selector switch 375. While modification of this structure for any number of storage positions may readily be made by one skilled in the art, this illustrative embodiment, with its 4 × 4 memory chips, illustrates structure for storing 4 such weights. With this structure each of four different users may select on switch 375 his individual operating position (U1, U2, U3, or U4) and thus configure the scale and its memory storage units for storing and comparing his personal subsequent measurements with his personal previous measurements. Similarly, if desired, a single user could store a plurality (four in this case) of his individual previous weight measurements for selective comparison against his subsequent weight measurements.

While the foregoing represents several preferred embodiments of the apparatus of this invention, it is recognized that other variations and embodiments, for example, different types of transducers, displays and electronic circuit components, may occur to persons skilled in this art. Accordingly, the scope of this inven-

I claim:

1. A scale for use in a personal dieting program, comprising:
   weight measuring means sensitive to weight increments at least as small as ½ pound for a weight measured by said scale;
   means for storing a previous measurement of weight for comparison with a subsequent measurement; and
   a digital display capable of displaying both said subsequent weight measured by said scale and the difference between said subsequent weight and said previous weight measured, indicating either weight gain or loss, said digital display providing for display of said subsequent weight measurement and said weight difference in increments at least as small as ½ pound, whereby measured weight gains and losses on the order of ½ pound may be observed by the user of said scale to thereby assist his dieting program.

2. A scale as in claim 1 wherein said weight measuring means is sensitive to weight increments at least as small as ¼ pound and wherein said digital display provides for display of said subsequent weight measurement and said weight difference to increments at least as small as ¼ pound.

3. A scale as in claim 1 wherein said weight measuring means is sensitive to weight increments at least as small as 1/10 pound and wherein said digital display provides for display of said subsequent weight measurement and said weight difference to increments at least as small as 1/10 pound.

4. A scale as in claim 1 wherein said weight measuring means includes means for averaging measured weight indications over a predetermined time period during weighing, whereby fluctuations in the displayed weight due to shifting of weight location on said scale may be reduced.

5. A scale as in claim 1 further comprising means associated with said digital display for indicating whether said displayed weight difference represents an increase or a decrease from said previous weight measurement, whereby the user may readily observe any weight gain or loss between the two measurements.

6. A scale as in claim 1 wherein said storage means comprises a plurality of individually selectable storage units, whereby a plurality of different users may each select a different one of such storage units for storing his individual measurements for use in comparing his personal subsequent measurements with his personal previous measurements.

7. A scale as in claim 1 wherein said digital display includes means for displaying first said subsequent weight measured and then displaying said difference between said subsequent weight measured and said previous weight measured.

8. A scale as in claim 7 wherein said means for displaying first said subsequent weight measured and then displaying said difference includes means for holding said display of said subsequent weight measurement for a predetermined time and then automatically changing to display said difference.

9. A scale as in claim 1 further comprising means for energizing circuitry for said measuring means and said display in response to the weight of a user being applied to said scale, whereby the electrical power drain associated with such scale may be minimized when such scale is not in use.

10. A scale as in claim 9 further comprising means for maintaining energization of said storage means continuously, whereby energization of the storage means is independent of the application of the weight of a user to the scale.

11. In a scale for use by an individual in a personal dieting program and having a digital display and means for measuring and displaying both the current weight of a user and the difference between such current weight and a previous weight, the improvement comprising:
    said weight measuring means being adapted for measuring weight increments at least as small as ½ pound; and
    said digital display being adapted to display in ½ pound increments both the current weight of a user and the difference between said current weight and a preselected previous weight of such user, indicating either weight gain or loss, whereby measured weight gains and losses on the order of ½ pound may be observed by such user to assist his dieting program.

12. In a scale as in claim 11 the further improvement of said weight measuring means being adapted for measuring weight increments at least as small as ¼ pound and said digital display being adapted to display said current weight and said difference in ¼ pound increments.

13. In a scale as in claim 11 the further improvement of providing means for indicating on said display said current weight for a predetermined length of time and then automatically changing said display to an indication of said weight difference.

14. In a scale as in claim 11 the further improvement of providing means for selectively storing a plurality of said previous weight measurements and comparing any selected one of said stored previous weight measurements with said current weight measurement for display of said difference.

15. In a scale as in claim 14 the further improvement of providing switch means for selecting a desired one of said plurality of stored previous weight measurements, whereby a plurality of individuals may each store his own weight measurement and then compare the same with a later weight measurement.

* * * * *